May 29, 1928.
R. C. DEALE ET AL
1,671,514
CONTROL SYSTEM
Original Filed July 16, 1924    2 Sheets-Sheet 1
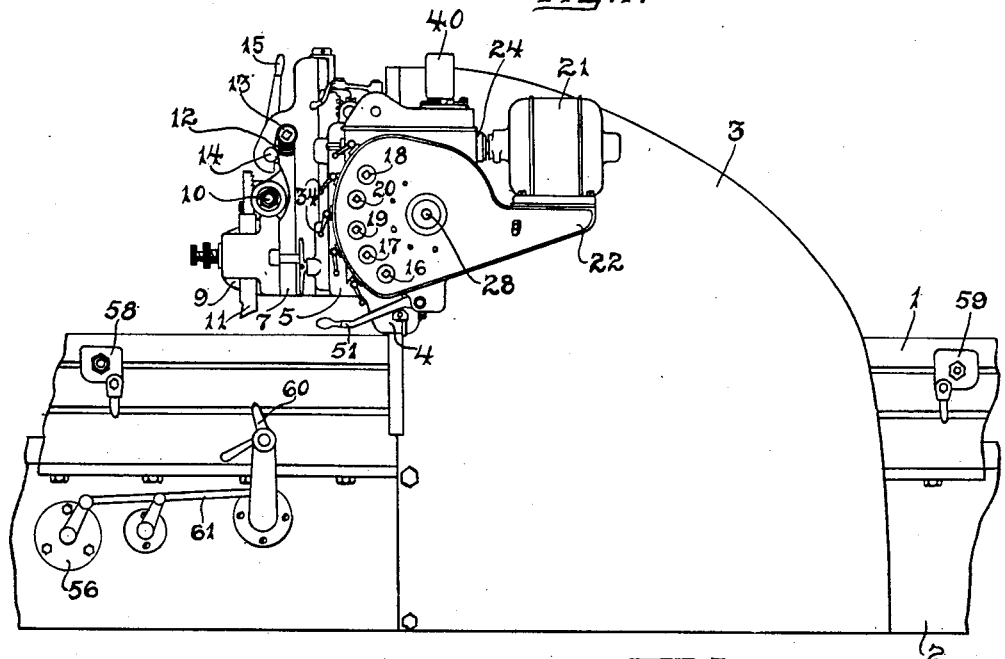
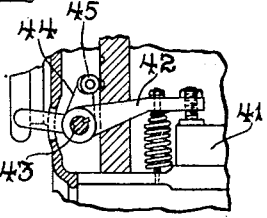
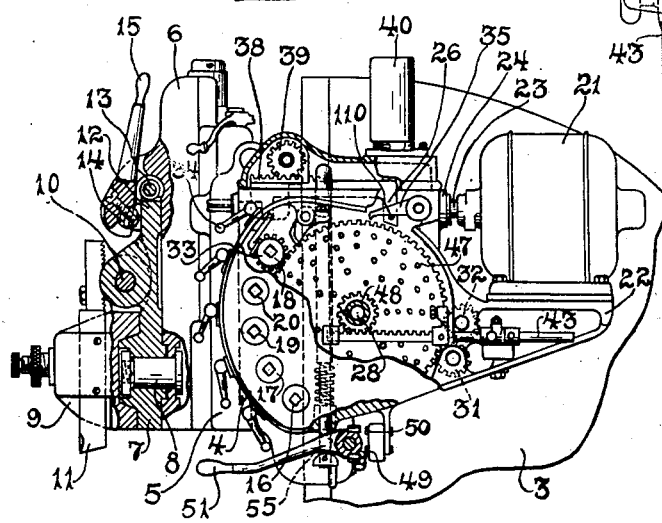
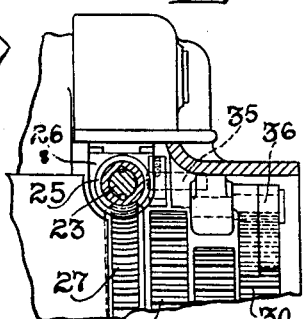
INVENTOR
R. C. Deale
N. Marcalus
BY Wayne B Wells
ATTORNEY

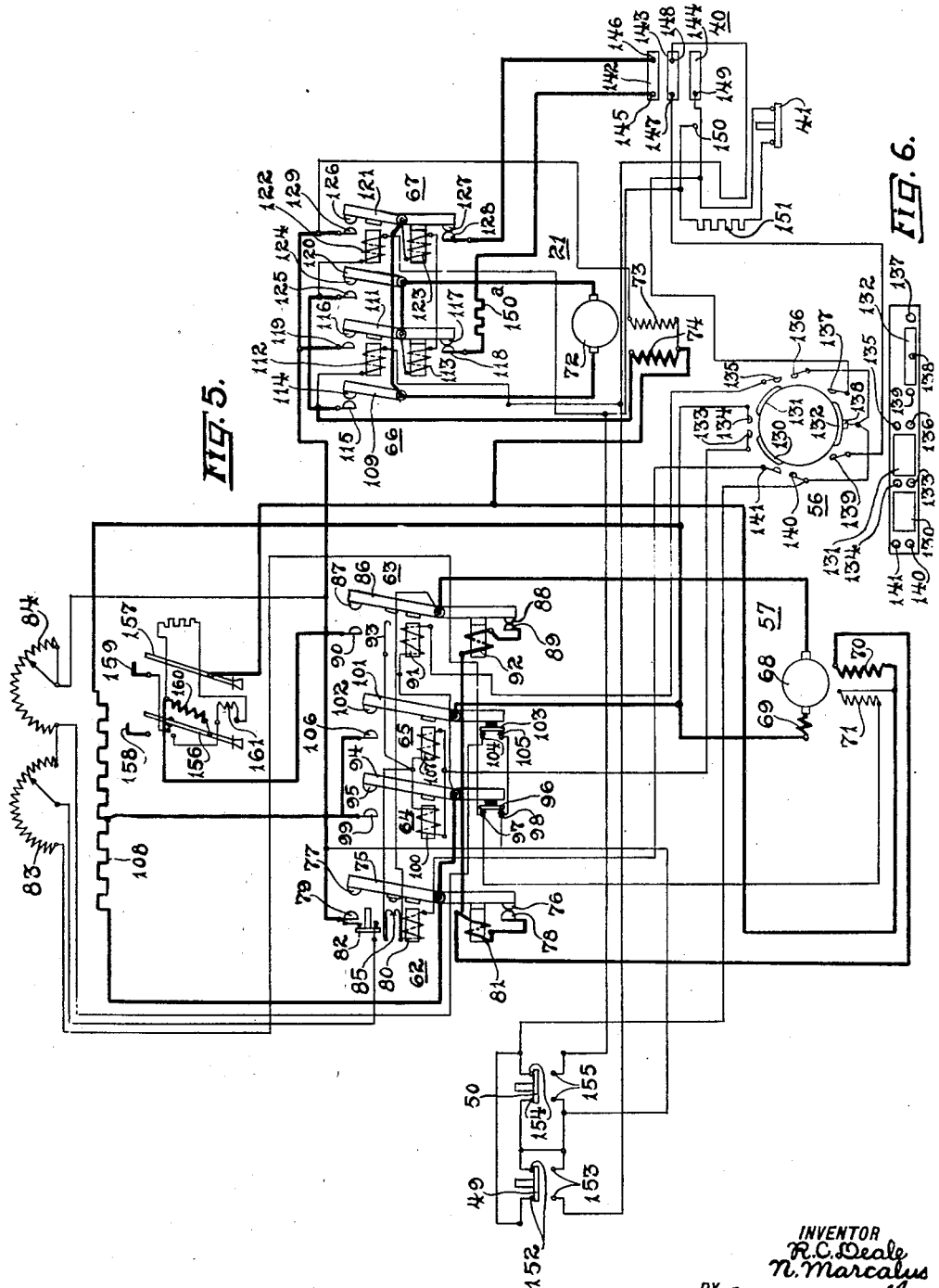

Patented May 29, 1928.

1,671,514

UNITED STATES PATENT OFFICE.

ROBERT C. DEALE AND NICHOLAS MARCALUS, OF PLAINFIELD, NEW JERSEY, ASSIGNORS TO NILES-BEMENT-POND COMPANY, OF NEW YORK, N. Y., A CORPORATION OF NEW JERSEY.

CONTROL SYSTEM.

Application filed July 16, 1924, Serial No. 726,345. Renewed September 13, 1927.

Our invention relates to control systems and particularly to control systems for operating machine tools.

One object of our invention is to provide a control system for a machine tool having a reciprocating member that shall operate a feed motor in one direction to clamp the cutting tools in position and that shall operate the feed motor in an opposite direction not only to unclamp the cutting tools but also to effect a feeding movement.

Another object of our invention is to provide a control system for a machine tool having a reciprocating member that shall operate a feed motor at each end of the stroke of the reciprocating member, that shall open the feed motor circuit after a predetermined period at each end of the stroke of said member, and that shall insure a quick stopping of the feed motor at one end of each stroke while permitting a drifting stop of the feed motor at the other end of each stroke.

Another object of our invention is to provide a planer control system that shall be provided with a feed motor operated at one end of the planer stroke for clamping the cutting tools in position and that shall be operated at the opposite end of the planer stroke not only to unclamp the cutting tools but also to effect a feeding movement.

In operating many machine tools, having a reciprocating member, and particularly in operating planers of the frog and switch type, it is desirable to clamp the cutting tool or tools firmly in position during each cutting operation. In a control system constructed in accordance with our invention, the pilot switch which controls the operation of the main motor also controls the operation of an auxiliary or feed motor. The feed motor is operated in one direction at the end of the return stroke of the planer table to clamp the cutting tools firmly in position and is operated in a reverse direction at the end of the cutting stroke not only to unclamp the tools but also to effect a feeding movement. During the unclamping operation, the tools are raised from the work and during the clamping operation, the tools are moved into engagement with the work. The circuit for the feed motor is completed by the pilot switch through a feed-motor controller at each end of the planer stroke. The controller is withdrawn from the feed-motor circuit after a predetermined operation of the feed motor. At the end of the return stroke, when a clamping operation is being effected, the controller opens the feed motor circuit and limits the operation of such motor. At the end of the cutting stroke, a resistor is connected in shunt to the controller so that the feed motor circuit is not broken when the controller is withdrawn from such circuit. Although the resistor permits sufficient current to flow therethrough for maintaining the feed motor in operation, it does not permit sufficient current to flow therethrough for starting the feed motor. The shunt circuit including the resistor is automatically opened to stop the feed motor when a predetermined feeding operation has been effected.

When the feed motor circuit is broken by opening the shunt circuit at the end of a cutting stroke, a dynamic braking circuit is completed through such motor for effecting a quick stop. However, at the end of the return stroke, when the feed motor circuit is broken by the controller, no dynamic braking circuit is completed and the motor is allowed to effect a drifting stop. Such drifting stop assists in effecting a clamping of the cutting tools in position. Auxiliary means is provided for so operating the feed motor as to traverse the cutting tools in either direction at will.

The control system disclosed in this application is particularly adapted for operating the frog and switch planer which is disclosed in the application of Nicholas Marcalus, Serial No. 721,229 filed June 20, 1924. The control system disclosed in this application is in some respects similar to the control system disclosed in the application of Harold L. Blood et al., Serial No. 659,364, filed August 25, 1923. The control of the main motor as disclosed in the present application is similar to the control of the main motor as disclosed in the application Serial No. 659,364.

In the accompanying drawings:

Figure 1 is a side elevational view of a planer adapted to be operated by our control system.

Fig. 2 is an enlarged detail view, partially in section, of the feeding mechanism shown in Fig. 1.

Fig. 3 is a detail view of the switch mechanism for opening the feed motor circuit at the end of a feeding movement.

Fig. 4 is another detail view of the feeding mechanism.

Fig. 5 is a diagrammatic view of a control system constructed in accordance with our invention.

Fig. 6 is a developed view of the pilot switch shown in Fig. 5.

Referring to Figs. 1, 2, 3, and 4 of the drawings, a planer is illustrated comprising a work carrying table 1 which is mounted on a suitable bed 2. Suitable uprights 3, one only of which is shown on the drawings, are provided for carrying a cross rail 4. The rail 4 has slidably mounted thereon two tool saddles 5, only one of which is shown on the drawings. The saddles 5 carry tool slides 6 which are adjustable in a manner to be hereinafter set forth. A block 7 is pivotally supported by a pin 8 on each slide 6 and a tool holder 9 is pivotally mounted on each block by a shaft 10. The tool holders 9 carry suitable cutting tools 11. Each of the blocks 7 is provided with worm teeth 12 on the upper end thereof which engage a worm shaft 13. The worm shaft 13 is operated to adjust the angular position of the block about the pin 8. An eccentric bolt 14, which is operated by a handle 15, is provided for locking each block in an adjusted position A screw shaft 16 is provided for raising or lowering the cross rail 4 on the uprights 3. Two screw shafts 17 and 18 are provided for respectively adjusting the saddles 5 on the cross rail 4 and two screw shafts 19 and 20 are provided for respectively adjusting the position of the tool slides 6 on the saddles 5. The screw shafts 16 to 20, inclusive, are operated by means of a feed motor 21 in a manner to be hereinafter set forth.

The feed motor 21, which is mounted on a bracket 22 extending from the cross rail 4, is provided with a shaft 23 having suitable bearings in a housing 24. The housing 24 is preferably an integral portion of the bracket 22. A worm member 25, which is splined to the shaft 23, is adapted to effect movement along such shaft. A block member 26 is mounted on the shaft 23 and is moved along such shaft in accordance with the movement of the worm member 25.

The worm member 25 meshes with a worm gear wheel 27 which is rotatably mounted on a shaft 28. A feed gear 29, which is fixedly mounted on a hub extending from the worm wheel 27, is connected to a feed gear wheel 30 through two pinions 31 and 32. The wheel 29 is loosely mounted on the shaft 28. Thus, the two feed gear wheels 29 and 30 are rotated together but in opposite directions. Each of the screw shafts 16 to 20, inclusive, carries a pinion 33 which is adapted to be moved into mesh with either of the gear wheels 29 and 30. The pinions 33 are splined to the screw shafts and are adapted to be shifted into mesh with either of the gear wheels 29 and 30 by means of levers 34. Such levers 34 control the direction of movement of the saddles on the cross rail and the direction of movement of the slides on the saddles. Moreover, one of such levers controls the raising and lowering of the cross rail on the uprights.

A set of pawls 35 are provided for engaging the feed gear wheel 29 to prevent operation of the feed gear wheels 29 and 30 and the worm wheel 27 when the motor 21 is operated in a direction to effect an unclamping operation. The block 26 is moved towards the left, as shown in Fig. 2 of the drawings, by the worm 25 to effect an unclamping operation when the worm wheel 27 is held stationary as above set forth. A set of pawls 36 engage the feed gear wheel 30 and prevent operation of the gear wheels 29 and 30 and the worm wheel 27 when the motor 21 is rotated in a direction to effect a clamping operation. In order to effect a clamping operation, the block 26 is moved towards the right, as shown in Fig. 2 of the drawings.

The block 26 carries two racks 38, only one of which is shown on the drawings, which are adapted to engage two pinions 39. The pinions 39 serve to control the clamping of the saddles on the rail and the slides on the saddles in the manner set forth in the copending application of Nicholas Marcalus Serial No. 721,229. The pinions 39 also serve to control the raising of the cutting tools from the work at the end of each cutting stroke and the lowering of the tools into engagement with the work at the end of each return stroke. In the construction above described, it will be noted that if the pawls 35 and 36 are respectively in engagement with the feed gear wheels 29 and 30, the worm wheel 27 will be held stationary and accordingly the worm member 25 and the block 26 will be moved in a direction corresponding to the direction of rotation of the feed motor 21. If the feed motor is rotated in a direction to effect an unclamping operation and a feeding movement of the cutting tools, the block 26 is moved towards the left, as shown in Fig. 2 of the drawings. Such movement of the block 26 effects rotation of the pinions 39 in a clockwise direction to unclamp the saddles from the rail and the slides from the saddles. The rotation of the pinions 39 is continued until the pawls 35, which engage the gear wheel 29, are raised by means of a pin 110 which projects from the block 26.

When the pawls 35 are raised by the pin 110, the gear wheels 29 and 30 are rotated by the worm member 25 on the motor shaft to effect the desired feeding movement. The feeding movement is stopped in a manner to be hereinafter set forth.

The movement of the block 26 not only controls the clamping and unclamping of the various saddles and slides but also operates a feed-motor controller 40. The feed-motor controller 40 operates somewhat in the manner of the usual limit switch used in planer control systems. When the block 26 is moved towards the right, as shown in Fig. 2 of the drawings, to effect a clamping operation, the controller 40 is operated to break the circuit of the motor 21. When the block 26 is moved towards the left, as shown in Fig. 2, to effect an unclamping operation and a feeding movement of the cutting tools, the controller 40 is withdrawn from the circuit of the feed motor. However, a holding circuit for the motor is maintained through a resistor 151 which is connected in shunt to the controller 40. The shunt circuit is opened in a manner to be hereinafter set forth for limiting the feeding movement.

A switch 41, which is included in the above mentioned shunt circuit, serves to open the shunt circuit for limiting the feeding movement. The switch 41 is operated by a lever 42, which is splined to a shaft 43, as shown in Figs. 2 and 3 of the drawings. The shaft 43 is suitably mounted on the bracket 22 and carries a lever 44 having a roller 45 mounted thereon. The roller 45 is held in engagement with the face of the feed gear wheel 30. The face of the feed gear wheel 30 has a number of series of indentations formed therein which cooperate with the roller 45 and the lever 44 for so rotating the shaft 43 as to operate the switch 41 through the lever 42. The shaft 43 may be moved in its bearings to bring the roller 45 and the lever 44 to cooperate with the various series of indentations on the face of the gear wheel 30. The longitudinal movement of the shaft 43 may be effected by means of a pinion 48 which is loosely mounted on the shaft 28. The pinion 48 meshes with rack teeth formed on the shaft 43.

Two switches 49 and 50 are provided for effecting traverse operation of the feed motor 21. The switches 49 and 50 are operated by means of a hand lever 51, as shown in Figs. 1 and 2 of the drawings. When the hand lever 51 is moved upwardly, as shown in Fig. 2 of the drawings, the switch 50 is operated for so rotating the motor 21 as to effect an unclamping operation. Upon unclamping of the slides and saddles, the tools are moved continuously in one direction. It will be noted the movement of the block 26 to unclamp the saddles from the rail and the slides from the saddles raises the pawls 35 to permit the free rotation of the feed gears 29 and 30. If the hand lever 51 is moved downwardly to operate the switch 49, it is necessary to release the pawls 36 from the gear wheel 30. A rod 55, which is operated by the lever 51, engages the pawls 36 and moves them out of engagement with the gear wheel 30 when the lever 51 is moved downward to operate the switch 49.

A pilot switch 56, as shown in Figs. 1 and 5, of the drawings, is provided not only for controlling the operation of the feed motor 21 but also for controlling the operation of a main motor 57. The pilot switch is operated by two dogs 58 and 59 which are adjustably secured to the table 1. The dogs 58 and 59 engage a lever 60 which is connected through a link 61 to the pilot switch 56. The dog 58 engages the lever 60 at the end of the cutting stroke for operating the pilot switch to effect operation of the main motor 57 in a reverse direction and also to reverse the direction of rotation of the feed motor 21. The feed motor is operated to unclamp the saddle from the rail and the slide from the saddle as well as to raise the tool out of engagement with the work. Moreover, a feeding movement of the cutting tool is effected at this time. The dog 59 engages the lever 60 for so operating the pilot switch 56 as to reverse the direction of rotation of the main motor 57. The pilot switch, when so operated, serves to operate the feed motor 21 to effect a clamping operation.

Referring to Figs. 5 and 6 of the drawings, the main motor 57 is operated by two main switches 62 and 63 and two accelerating switches 64 and 65. The feed motor 21 is controlled by two feed switches 66 and 67. The main motor comprises an armature 68, a compensating winding 69, a series-field magnet winding 70, and a shunt field-magnet winding 71. The feed motor 21 comprises an armature 72, a shunt field-magnet winding 73, and a series field-magnet winding 74.

The main switch 62 comprises a switch arm 75 having two contact members 76 and 77 mounted thereon. The contact member 76 is adapted to engage a stationary contact member 78 in the released position of the switch arm and the contact member 77 is adapted to engage a stationary contact member 79 in the operative position of the switch arm. An electro-magnet 80 is provided for operating the switch arm 75 and a holding magnet 81 is provided for holding the switch arm 75 in a released position when the main switch 63 is in an operative position and also when a dynamic braking current is flowing through the main motor 57. A switch 82 is operated by the switch arm 75 for inserting two resistors 83 and 84 in circuit with the shunt field-magnet winding 71. The return stroke of the planer table 3 is effected when the main switch 62 is operated. The insertion of the resistors 83 and 84 in the circuit of the winding 71 increases the speed of such return stroke. A second switch 85 is operated by the switch arm 75 for completing the energizing circuit for the accelerating switches 64 and 65.

The main switch 63 comprises a switch arm 86 having two contact members 87 and 88 mounted thereon. The contact member 88 engages a stationary contact member 89 in the released position of the switch arm and the contact member 87 engages a stationary contact member 90 in the operative position of the switch arm. A magnet 91 is provided for operating the switch arm 86 and a holding magnet 92 is provided for holding the switch arm 86 in a released position when a dynamic braking current is flowing through the motor 57 and when the main switch 62 is in an operative position. An auxiliary switch 92 is operated by the switch arm 86 to complete energizing circuits for the accelerating switches 64 and 65.

The accelerating switch 64 comprises a switch arm 94 having two contact members 95 and 96 mounted thereon. The contact member 96 is insulated from the switch arm 94 and is adapted to bridge two contact members 97 and 98 in the released position of the switch arm. The contact member 95 engages a stationary contact member 99 when the switch arm 94 is in an operative position. A magnet 100 is provided for operating the switch arm 94.

The accelerating switch 65 comprises a switch arm 101 which has two contact members 102 and 103 mounted thereon. The contact member 103, which is insulated from the switch arm 101, bridges two contact members 104 and 105 in the released position of the switch arm 101. The contact member 102 engages a stationary contact member 106 when the switch arm 101 is in an operative position. A magnet 107 is provided for operating the switch arm 101. The accelerating switches 64 and 65 serve to short circuit an accelerating resistor 108 in the circuit of the main motor 57.

The feed switch 66 comprises two switch arms 109 and 111, an operating magnet 112, and a holding magnet 113. The switch arm 109 carries a contact member 114 which engages a stationary contact member 115 in the operative position of the switch arm. The switch arm 111 carries two contact members 116 and 117. The contact member 117 engages a stationary contact member 118 in the released position of the switch arm and the contact member 116 engages a stationary contact member 119 in the operative position of the switch arm.

The feed switch 67 comprises two switch arms 120 and 121, an operating magnet 122, and a holding magnet 123. The switch arm 120 carries a contact member 124 which engages a stationary contact member 125 in the operative position of the switch arm. The switch arm 121 carries two contact members 126 and 127. The contact member 127 engages a stationary contact member 128 in the released position of the switch arm and the contact member 126 engages a stationary contact member 129 in the operative position of the switch arm.

The pilot switch 56 comprises three contact segments 130, 131 and 132 which are adapted to engage contact fingers 133 to 141, inclusive, for controlling the operation of the main motor 57 and the feed motor 21. The feed motor controller 40 comprises three contact segments 142, 143 and 144 which engage contact fingers 145 to 150, inclusive. The switch 41, which is operated by the lever 42 shown in Fig. 3 of the drawings, connects a resistor 151 across the contact fingers 149 and 150 of the controller 40. The traverse switch 49 normally bridges contact members 152 in the released position and bridges contact members 153 in the operative position. The traverse switch 50 bridges contact members 154 in the released position and bridges contact members 155 in the operative position. A circuit breaker comprising switch arms 156 and 157 is provided for connecting the control system to the supply conductors 158 and 159. The circuit breaker is operated by an over-load coil 160 and low voltage coil 161.

Assuming the planer table 1 to be at the end of the return stroke, the dog 59 engages the lever 60 for operating the pilot switch 56. The pilot switch 56 is so moved that the contact segment 131 bridges the contact fingers 135 and 136 for operating the main switch 63, the contact segment 130 bridges the contact fingers 133 and 134 for operating the accelerating magnets 64 and 65, and the contact segment 132 bridges contact fingers 138 and 139 for operating the feed switch 66.

The bridging of the contact fingers 135 and 136 by the contact segment 131 completes an energizing circuit which extends from the supply conductor 158 through the switch arm 156, coil 160, switches 49 and 50, contact fingers 135 and 136, which are bridged by the contact segment 131, operating magnet 91, switch arm 75, contact members 76 and 78, holding magnet 81, series field-magnet winding 70, and the switch arm 157 to the supply conductor 159. The switch 63 is operated and a circuit is completed from the supply conductors 158 and 159 for operating the main motor 57. The circuit through the main motor extends from the supply conductor 158, through the switch arm 156, coil 160, contact members 90 and 87, switch arm 86, armature 68, compensating winding 69, accelerating resistor 108, switch arm 75, contact members 76 and 78, holding-coil 81, series field-magnet winding 70, and the switch arm 157 to the supply conductor 159. The main motor 57 is operated in a direction to effect a cutting stroke by the planer table 1.

The bridging of the contact fingers 133 and 134 by the contact segment 130 serves to connect the accelerating magnets 100 and 107 of the accelerating switches 64 and 65 across the terminals of the armature 68. The circuit through the energizing coils 100 and 107 extends from one terminal of the armature 68 through the compensating winding 69, contact fingers 134 and 133, which are bridged by the contact segment 130, operating magnets 100 and 107 in parallel, switch 93, and the switch arm 86 to the other terminal of the armature 68. The accelerating magnets 64 and 65 serve to short circuit the accelerating resistor 108.

Prior to the operation of the accelerating switches 64 and 65, the circuit of the shunt field-magnet winding 71 extends from the supply conductor 158 through the switch arm 156, winding 160, contact members 97 and 98, which are bridged by the contact member 96, shunt field-magnet winding 71, and the switch arm 157 to the supply conductor 159. Upon operation of the accelerating switches, the direct connection of the shunt field-magnet winding across the supply conductors is broken and a circuit is completed for the winding which extends from the supply conductor 158 through the switch arm 156, winding 160, switch 82, resistor 83, shunt field-magnet winding 71, and the switch arm 157 to the supply conductor 159. The including of only the resistor 83 in the shunt field magnet winding circuit serves to effect the cutting stroke at a moderately slow speed.

The bridging of the contact fingers 138 and 139 by the contact segment 132 completes a circuit which extends from the supply conductor 158, through the switch arm 156, winding 160, switches 49 and 50, contact fingers 138 and 139, which are bridged by the contact segment 132, contact fingers 147 and 148, which are bridged by the contact segment 143, operating magnet 112, series winding 74, and the switch arm 157 to the supply conductor 159. The feed switch 66 is operated for connecting the feed motor 21 to the supply conductors 158 and 159. The circuit through the feed motor 21 extends from the supply conductor 158 through the switch arm 156, winding 160, contact members 119 and 116, switch arm 111, armature 72, switch arm 109, contact members 114 and 115, series winding 74, and the switch arm 157 to the supply conductor 159. The shunt field-magnet winding 73 is directly connected across the supply conductors 158 and 159.

The feed motor 21 is operated in such direction as to move the block 26 towards the right, as shown in Fig. 2 of the drawings. Such movement of the block 26, as heretofore set forth, serves to effect a clamping operation prior to the cutting stroke by the planer table. Upon a predetermined movement of the block 26, the controller 40 is moved to disconnect the contact segment 143 from the contact finger 148 and to bridge the contact fingers 149 and 150 by the contact segment 144. The separating of the contact segment 143 from the contact finger 148 serves to release the feed switch 66 and to open the circuit of the feed motor 21. It will be noted the release of the switch 66 at this time establishes no dynamic braking circuit through the feed motor 21. Consequently the feed motor is allowed to drift to a stop when a clamping operation is being effected.

At the end of the cutting stroke of the planer table, the dog 58 engages the lever 60 for reversing the position of the pilot switch 56. The contact segment 131 disengages the contact fingers 135 and 136 for releasing the main switch 62 and bridges the contact fingers 133 and 134 for operating the accelerating switches 64 and 65 when the main motor is operated in a reverse direction. The contact segment 130 bridges the contact fingers 140 and 141 for operating the main switch 62 to rotate the main motor 57 in such direction as to effect a return stroke of the table 1. The contact segment 132 bridges the contact fingers 137 and 138 for operating the feed switch 67.

Upon release of the main switch 63, a dynamic braking circuit is completed through the main motor 57 which extends from one terminal of the armature 68 through the winding 69, resistor 108, switch arm 75, contact members 76 and 78, holding coils 81 and 92, contact members 88 and 89, and switch arm 86 to the other terminal of the armature 68.

The circuit for operating the switch 62 extends from the supply conductor 158 through the switch arm 156, coil 160, switches 49 and 50 in parallel, contact fingers 140 and 141, which are bridged by the contact segment 130, operating magnet 80, switch arm 86, contact members 88 and 89, holding coil 92, series field-magnet winding 70 and the switch arm 157 to the supply conductor 159. The switch arm 75 is operated and a circuit is completed through the main motor for effecting a return stroke of the planer table. The circuit through the main motor extends from the supply conductor 158, through switch arm 156, coil 160, contact members 79 and 77, switch arm 75, resistor 108, winding 69, armature 68, switch arm 86, contact members 88 and 89, holding coil 92, series winding 70, and the switch arm 157 to the supply conductor 159. The two accelerating switches 64 and 65 are operated in the manner above set forth for again short circuiting the resistor 108.

Upon operation of the accelerating switches 64 and 65, the circuit for the shunt field magnet winding 71 extends from the supply conductor 158, through the switch arm 156, winding 160, resistors 83 and 84, winding 71, and the switch arm 157 to the supply conductor 159.

The circuit for operating the feed switch 67 extends from the supply conductor 158 through the switch arm 156, winding 160, switches 49 and 50, in parallel, contact fingers 138 and 137, which are bridged by the contact segment 132, contact fingers 149 and 150, which are bridged by the contact segment 144, coil 122, series field winding 74, and the switch arm 157, to the supply conductor 159. The energizing circuit for the feed switch 67 is completed for operating the feed motor 21 in such direction as to effect not only an unclamping operation but also a feeding movement of the cutting tools. The circuit through the feed motor extends from the supply conductor 158 through the switch arm 156, coil 160, contact members 129 and 126, switch arm 121, armature 72, switch arm 120, contact members 124 and 125, series winding 74, and the switch arm 157 to the supply conductor 159. The feed motor 21 is operated in such direction as to move the block 26 towards the left, as shown in Fig. 2 of the drawings. Such movement of the block 26 serves first to unclamp the saddles from the rail and the slides from the saddles and then to operate the controller 40 to separate the contact segment 144 from the contact finger 150. The separating of the contact segment from the contact finger, however, does not open the operating circuit of the feed switch 67 inasmuch as the contact fingers 149 and 150 are bridged by a resistor 151 and the switch 41. The resistor 151 is of such strength as to hold the switch 67 in an operative position but not to permit the operating of the switch 67 unless the controller is in position to bridge the contact fingers 149 and 150 by the contact segment 144. The feeding operation by the feed motor 21 is continued until the switch 41 is opened by the lever 42 as heretofore set forth.

Upon operation of the switch 41, the feed switch 67 is released and a dynamic braking circuit is completed through the feed motor 21. The dynamic braking circuit through the feed motor extends from one terminal of the armature 72, through the switch arm 121, contact members 127 and 128, contact members 145 and 146, which are bridged by the contact segment 142, braking resistor 150ª, contact members 117 and 118, and the switch arm 111, to the other terminal of the armature 72. In the above described operation of the controller 40, it will be noted a dynamic braking circuit is only completed at one end of the stroke of the planer and when a feeding movement is effected.

At the end of the return stroke, the dog 59 engages the lever 60 for operating the pilot switch 56 to again effect a cutting stroke. The operation of the pilot switch releases the main switch 62 to complete a dynamic braking circuit through the main motor 57. The above cycle of operations of the main motor and the feed motor is again repeated.

The traverse switches 49 and 50 serve to effect continuous operation of the feed motor at will. Upon operation of the switch 49, a circuit is completed for operating the feed switch 66 and upon operation of the traverse switch 50, a circuit is completed for operating the feed switch 67. The feed switch 66, as above set forth, effects operation of the feed motor in one direction and the feed switch 67 effects operation of the feed motor in an opposite direction. The circuit established by the traverse switch 49 through the operating magnet of the feed switch 66 extends from the supply conductor 158, through the switch arm 156, coil 160, contact members 153, which are bridged by the switch 49, magnet 112, series winding 74, and the switch arm 157 to the supply conductor 159. The circuit completed by the switch 50 through the operating magnet of the switch 67 extends from the supply conductor 158 through the switch arm 156, coil 160, contact fingers 155, which are bridged by the switch 50, magnet 122, series winding 74, and the switch arm 157 to the supply conductor 159.

Modifications in the system and in the arrangement and location of parts may be made within the spirit and scope of our invention and such modifications are intended to be covered by the appended claims.

What we claim is:

1. In a control system for a machine tool, the combination with a reciprocating table, a feed motor, and means for operating the feed motor at each end of the stroke of the reciprocating table, of a controller included in the motor circuit at each operation of the motor, means for excluding said controller from the motor circuit after a predetermined rotation of the motor, and a resistor connected in shunt to said controller when the motor is operated at one end of the planer stroke to prevent the stopping of the motor by the controller operation.

2. In a control system for a machine tool, the combination with a reciprocating table, a feed motor, and means for operating the feed motor at each end of the stroke of the reciprocating table, of a controller included in the motor circuit at each operation of the motor, means for excluding said controller from the motor circuit after predetermined rotation of the motor, a resistor connected in shunt to said controller when the motor is operated at one end of the planer stroke to prevent the stopping of the motor by the controller operation, and automatic means for opening said shunt circuit upon a predetermined operation of the motor.

3. In a control system for a machine tool, the combination with a reciprocating table, a feed motor, and means for operating the feed motor at each end of the stroke of the reciprocating table, of a controller included in the motor circuit at each operation of the motor, means for excluding said controller from the motor circuit after a predetermined rotation of the motor, a shunt holding circuit for said motor around said controller to prevent the stopping of the motor by the controller at one end of the stroke, means for automatically opening the shunt circuit upon a predetermined operation of the motor, and means for completing a dynamic braking circuit through the motor upon opening of the shunt circuit.

4. In a control system for a machine tool, the combination with a reciprocating table, a feed motor, and means for operating the feed motor at each end of the stroke of the reciprocating table, of a controller included in the motor circuit at each operation of the motor, means for excluding said controller from the motor circuit after a predetermined rotation of the motor, a shunt holding circuit for said motor around said controller to prevent the stopping of the motor by the controller at one end of the planer stroke, means for automatically opening the shunt circuit upon a predetermined operation of the motor, and means for completing a dynamic braking circuit through the motor upon opening of the shunt circuit, and means for effecting traverse operation of the motor in a forward or in a reverse direction.

5. In a control system for a machine tool, the combination with a reciprocating member, a feed motor, and means comprising a pilot switch operated by the reciprocating member for closing circuits to operate the feed motor in a forward and in a reverse direction, of a controller included in the feed-motor circuit at each operation of the feed motor, means for excluding the controller from the feed-motor circuit after a predetermined rotation of the feed motor, said controller serving to limit the movement of the feed motor at one end of the stroke of the reciprocating member, a shunt circuit for the feed motor around said controller to prevent the controller limiting the movement of the feed motor at the opposite end of the stroke of the reciprocating member, and automatic means for opening said shunt circuit to limit the motor operation.

6. In a control system for a machine tool, the combination with a reciprocating table, a cutting tool for engaging work carried by said table, means comprising a feed motor for clamping and unclamping the cutting tool in position and for effecting feeding movements of the tool, a pilot switch operated by said table for closing circuits to operate the feed motor in a forward and in a reverse direction, and a feed-motor controller included in the circuit of said feed motor at each operation thereof, of means for excluding said controller from the motor circuit after a predetermined rotation of the motor, the operation of the controller at one end of the table stroke serving to limit the movement of the feed motor, a shunt circuit for the feed motor around the controller to prevent the controller limiting the movement of the feed motor at the opposite end of the table stroke when the motor is rotating in a direction to effect a feeding movement, and automatic means for opening said shunt circuit after a predetermined feeding movement.

7. In a control system for a machine tool, the combination with a reciprocating member, a feed motor, a pilot switch operated by the reciprocating member for operating the feed motor in a forward and in a reverse direction, a feed-motor controller included in the circuit of said motor at each operation thereof and means for excluding the controller from the feed-motor circuit after a predetermined rotation of the feed motor, said controller serving to limit the movement of the feed motor when the motor is rotating in a forward direction, of a resistor connected to the feed motor in shunt to said controller to prevent the controller limiting the movement of the feed motor when the motor is rotating in a reverse direction to effect a feeding movement, and automatic means for opening said shunt circuit to limit the feeding movement.

8. In a control system for a machine tool, the combination with a reciprocating table, a feed motor, a pilot switch operated by the table for operating the feed motor in a forward and in a reverse direction, a controller in circuit with said motor when operated in a forward and in a reverse direction, and means for excluding the controller from the feed motor circuit after a predetermined rotation of the feed motor, said controller serving to open the motor circuit after a predetermined rotation in a forward direction, of a holding circuit comprising a resistor connected in shunt to said controller for maintaining the operation of said motor in a reverse direction, said resistor permitting sufficient current to flow therethrough only for maintaining the operation of the feed motor and not for starting such motor and automatic means for opening said shunt circuit upon a predetermined operation of the feed motor in a reverse direction.

9. In a control system for a machine tool, the combination with a reciprocating table, a feed motor, a pilot switch operated by said table for operating the feed motor in a forward and in a reverse direction, a controller in circuit with said motor when operated in a forward and in a reverse direction, means for excluding the controller from the feed motor circuit after a predetermined rotation of the feed motor, said controller serving to open the motor circuit after a predetermined rotation in a forward direction, of a holding circuit for said motor having a resistor connected in shunt to said controller when the motor is operated in a reverse direction, means for opening said shunt circuit to open the feed motor circuit when the feed motor has been operated a predetermined amount in a reverse direction, and means for establishing a dynamic braking circuit through the motor when said shunt circuit is opened.

10. In a control system for a machine tool, the combination with a reciprocating table, a feed motor, and a pilot switch for operating the feed motor in a forward and in a reverse direction according to the movement of the table, of a controller in circuit with the feed motor when operated in a forward and in a reverse direction, means for automatically moving the controller out of the motor circuit when the motor is rotated a predetermined amount in either direction, when the motor is rotating in a forward direction said controller serving to open the motor circuit, a holding circuit for said motor having a resistor connected in shunt to said controller, and means for opening said shunt circuit to stop the feed motor when rotated a predetermined amount in a reverse direction.

11. In a control system for a machine tool, the combination with a reciprocating table, a feed motor, and a pilot switch for operating the feed motor in a forward and in a reverse direction according to the movement of the table, of a controller in circuit with the feed motor when operated in a forward and in a reverse direction, means for automatically moving the controller out of the motor circuit when the motor is rotated a predetermined amount in either direction, when the motor is rotating in a forward direction said controller serving to open the motor circuit, a holding circuit for said motor having a resistor connected in shunt to said controller, means for opening said shunt circuit to open the motor circuit when the feed motor is rotated a predetermined amount in a reverse direction, and means governed by said controller for establishing a dynamic braking circuit through the feed motor only when the motor circuit is opened while the motor is rotating in a reverse direction.

12. In a control system for a machine tool, the combination with a reciprocating table, a cutting tool, a feed motor for clamping and unclamping the cutting tool and for effecting feeding movements by said tool, a pilot switch operated in accordance with the movement of the table for closing circuits to operate the feed motor in a forward and in a reverse direction, and means operated by the feed motor for unclamping the cutting tool and effecting a feeding movement thereof when rotating in a reverse direction and for clamping the cutting tool in position when rotating in a forward direction, of a feed-motor controller included in the feed-motor circuit at each operation of the feed motor, means for excluding the controller from the feed motor circuit after a predetermined rotation of the feed motor, said controller serving to limit the movement of the feed motor when rotating in a direction to clamp the tool in position, a shunt circuit comprising a resistor, connected in shunt to said controller, for preventing the limiting of the feed-motor movement when operated in a reverse direction to effect a feeding movement, and automatic means for opening said shunt circuit after the feed-motor has made a predetermined movement.

13. In a control system for a machine tool, the combination with a reciprocating table, a cutting tool, a feed motor for clamping and unclamping the cutting tool and for effecting feeding movements by the cutting toll, and a pilot switch operated in accordance with the movement of the reciprocating table for operating the feed motor in a forward and in a reverse direction, of a feed-motor controller included in the feed motor circuit at each operation of the feed motor, means for moving said controller out of the feed motor circuit after a predetermined rotation of the feed motor in either direction, said controller serving to limit the movement of the feed motor when a clamping operation is being effected, a resistor connected in shunt to the controller when the feed motor is operated to effect an unclamping and a feeding operation, said shunt circuit serving to prevent the limiting of the feed motor by the controller when a feeding movement is being effected, and means for automatically opening said shunt circuit after a predetermined feeding movement has been effected.

14. In a control system for a machine tool, the combination with a reciprocating table, a cutting tool, and means comprising a feed motor for clamping the cutting tool in position when rotated in one direction and for unclamping the cutting tool for effecting a feeding movement of such tool when rotated in a reverse direction, of a pilot switch operated in accordance with the movement of the table for operating the feed motor in a forward and in a reverse direction, a feed-motor controller included in the feed motor circuit at each operation of the feed motor, means for moving said controller out of the feed motor circuit after a predetermined rotation of the motor in either direction, said controller serving to open the feed motor circuit and prevent further operation thereof when the feed motor is operated a predetermined amount in a direction to effect a clamping operation, a resistor connected to the feed motor in shunt to said controller and serving to prevent the limiting of the feed motor movement when the motor is operated in a direction to effect a feeding movement, and auxiliary mechanism operated by the feed motor for opening said shunt circuit to limit the feeding movement.

15. In a control system for a machine tool, the combination with a reciprocating table, a cutting tool, a main motor for operating the table, a feed motor for clamping and unclamping the cutting tool and for effecting feeding movements thereof, and a pilot switch operated by the reciprocating table for operating the main motor in a forward and in a reverse direction and for operating the feed motor in a forward and in a reverse direction, of a feed-motor controller included in the feed-motor circuit at each operation of the feed motor, a resistor connected to the feed motor in shunt to the controller when the feed motor is operated in a direction to effect an unclamping operation and a feeding movement, means comprising a block member moved in one direction by the feed motor to effect a clamping operation and to so operate the controller as to limit the movement of the feed motor, said block member when moved in a reverse direction by the feed motor serving to effect an unclamping operation and to withdraw the controller from the feed motor circuit, means operated by the feed motor when rotated in a direction to effect an unclamping operation for effecting a feeding movement, and automatic means operated after a predetermined feeding movement for opening said shunt circuit to limit the movement of the feed motor.

In testimony whereof, we hereto affix our signatures.

NICHOLAS MARCALUS.
ROBERT C. DEALE.